Feb. 14, 1950 E. A. REHWALD 2,497,794
ELECTRIC MOTOR-DRIVEN OPERATOR
Filed Nov. 8, 1945 2 Sheets-Sheet 1
Fig. 1.
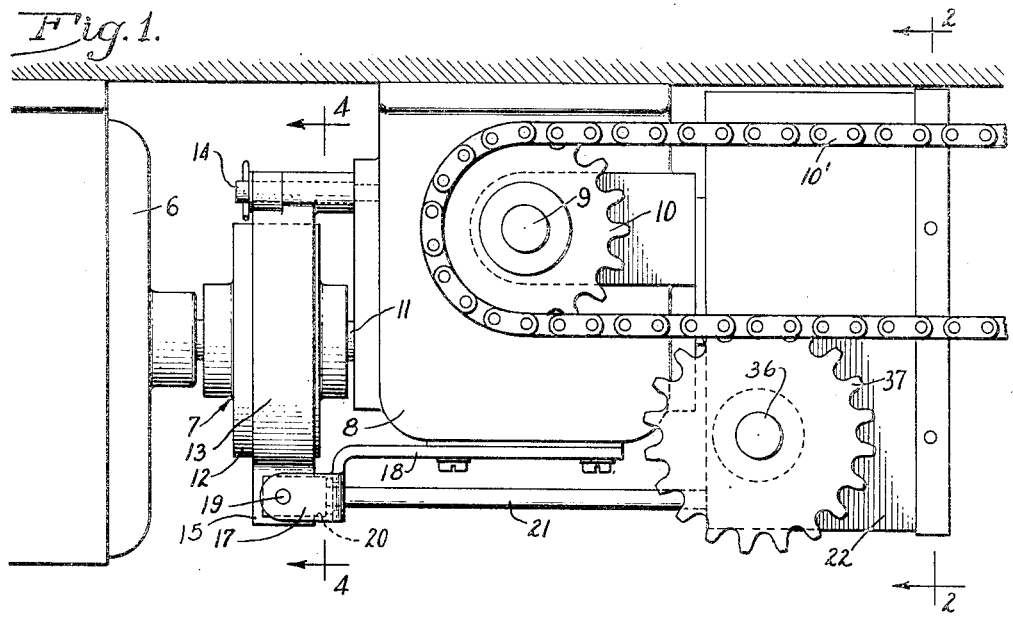
Fig. 2.
Fig. 3.
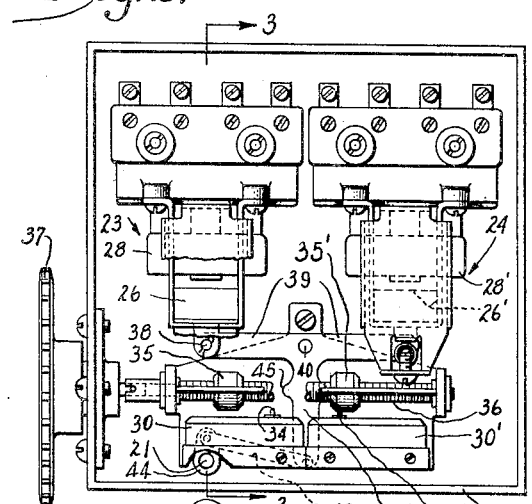
Fig. 4.
INVENTOR.
Edmund A. Rehwald
BY
Carlson, Pitzner, Hubbard & Wolfe
ATTORNEYS INVENTOR.
Edmund A. Rehwald Patented Feb. 14, 1950

2,497,794

UNITED STATES PATENT OFFICE 2,497,794

ELECTRIC MOTOR-DRIVEN OPERATOR

Edmund A. Rehwald, Rockford, Ill., assignor to Barber-Colman Company, Rockford, Ill., a corporation of Illinois Application November 8, 1945, Serial No. 627,472

8 Claims. (Cl. 318—266)

This invention relates to a electric motor driven operator for moving a device to be actuated back and forth through a predetermined distance in successive cycles of an electric motor which are started under manual control and terminated automatically. Such operators are usually started by a magnetic relay controlled from a remote point, and quick stopping of the actuated device is usually effected by an automatically applied friction brake which is released by a solenoid.

One object of this invention is to control the application and release of the friction brake in a novel manner.

A more detailed object is to release the brake directly from the motion of the relay armature whose switches control the starting of the motor.

The invention also resides in the simple construction of the brake control mechanism.

A further object is to provide for positively actuating the motor control switches to stop the motor in the event that the normally acting limit switches fail.

Other objects and advantages of the invention will become apparent from the following detailed description taken in connection with the accompanying drawings, in which Figure 1 is a fragmentary side elevational view of an electric motor driven operator embodying the present invention.

Fig. 2 is a front elevational view looking in the direction of the arrows 2—2.

Figs. 3 and 4 are sectional views taken respectively along the lines 3—3 and 4—4 of Figs. 2 and 1.

Figure 5:
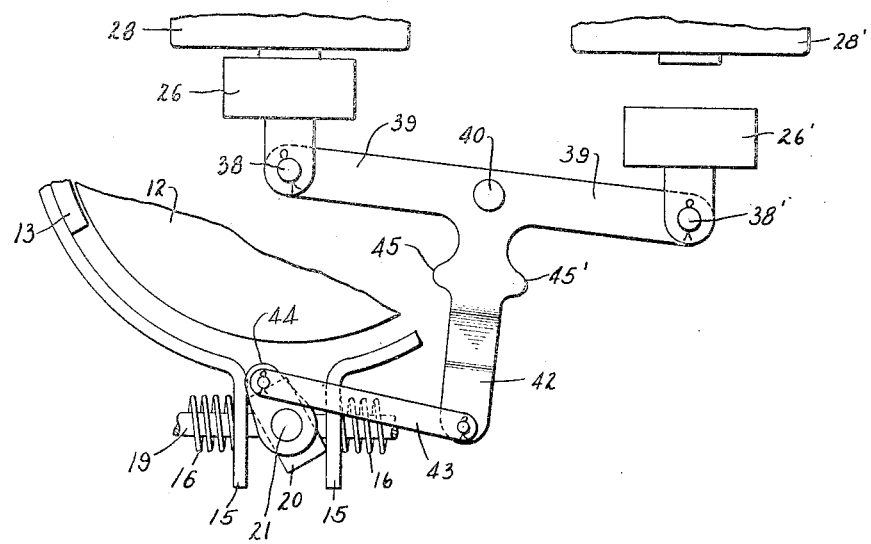
Fig. 5 is a fragmentary elevational view of part of the brake actuator.
Figure 6:
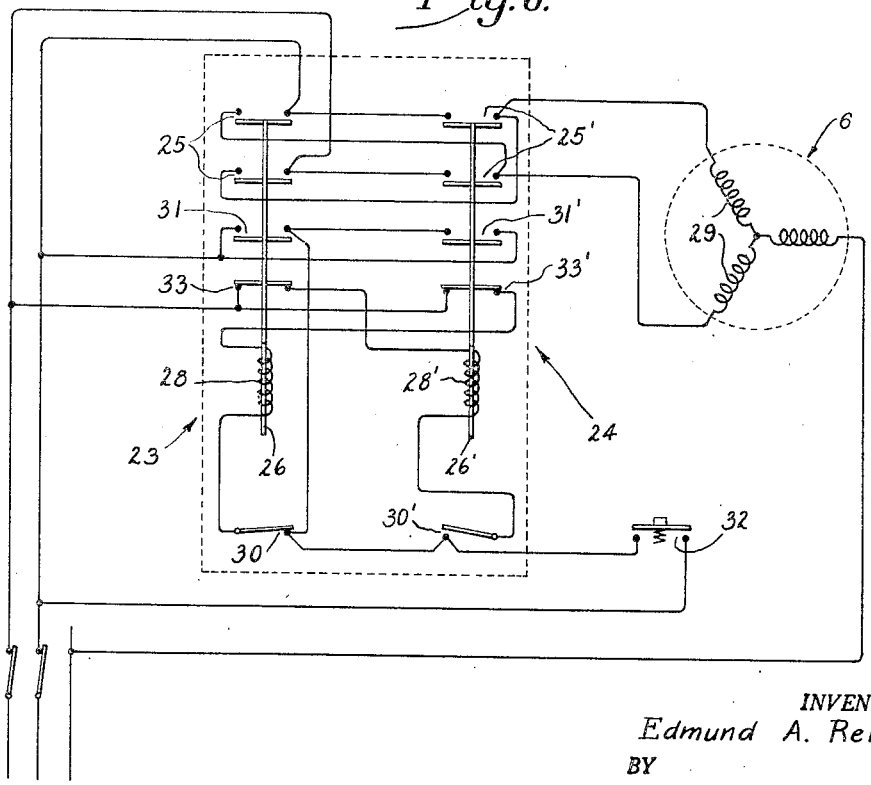
Fig. 6 is a circuit diagram.

The power operator shown for purposes of illustration comprises a reversible electric motor 6 operating through a coupling 7 and speed reduction gearing within a case 8 to drive a shaft 9 which is connected through a sprocket 10 and a chain 10' to a device (not shown) to be moved back and forth through predetermined distances. The high speed shaft 11 carries a brake drum 12 whose external surface is encircled by brake shoes 13 pivoted at 14 and having parallel projections 15 at their free ends on the other side of the drum. Springs 16 encircle a guide pin 19 and act in compression between the projections 15 and arms 17 of a bracket 18 on the gear case 8. Separation of the projections 15 to release the brake is effected by a cam 20 fast on a rockshaft 21 journaled at opposite ends in the bracket 18 and in a frame 22 on the other side of the gear case. When the cam is in the neutral position shown, the shoes are collapsed around the drum by the springs 16 and the brake is applied to frictionally hold the shaft 11 against turning. Turning of the rockshaft and cam in either direction away from this neutral position results in separation of the projections 15 and the shoes 13 thereby releasing the brake.

Starting and stopping of the motor is controlled by the switches of magnetic contactors or relays 23 and 24 mounted side by side in the frame 22, the relays shown being of the type manufactured by The Square D Company. The relay 23 has switches 25 which are closed by upward sliding movement of a frame having an armature 26 pivoted thereon at 27, the armature being attracted to a magnet core by energization of a coil 28. Closure of the switches completes a circuit for the three phase windings 29 of the motor shown, the energization of which is maintained through a normally closed limit switch 30 of the microswitch type and a holding switch 31 which is closed when the relay 26 is energized. The relay coil 28 is energized in response to manual closure of a switch 32 located at a remote point of control and arranged in series with a switch 33' which is closed when the relay 24 is deenergized. The relay 24 is equipped with similar switches 25' (to energize the motor windings 29) and switch 31' acting in conjunction with the limit switch 30' to hold the circuit for the winding 28', after this winding has been energized in response to manual closure of switch 32 arranged in series with switch 33 which is closed when the relay 23 is deenergized.

The pins 34 and 34' of the limit switches 30 and 30' are actuated by cams 35 and 35' that travel back and forth along a screw 36 as the motor operates in opposite directions. This screw is journaled in the frame 22 and carries a sprocket 37 meshing with the chain 10' so as to move in unison with the device actuated by the motor operator.

When the switch 32 is closed with the parts positioned as shown, the coil 28 of the relay 23 is energized through the switch 33'. The resulting movement of the armature 26 closes the switch 31 for holding the energization of the relay and the switches 25 for starting the motor in a direction to advance the nuts 35 and 35' to the right as viewed in Fig. 2. The cycle is terminated when the nut 35 reaches the pin 34 and opens the limit switch 30 and the holding circuit thereby deenergizing the relay 23. Similar operation of the motor in the reverse direction takes place when the control switch 32 is again closed, this cycle being terminated by opening of the limit switch 30′ when the parts reach the position shown in Fig. 2.

In accordance with the present invention, provision is made for utilizing the motion of either one or the other of the relay armatures 26 and 26′ to release the brake 12, 13 at the start of the cycles initiated by these armature motions. To this end, the armatures are pivotally connected at 38 and 38′ with the ends of oppositely projecting arms 39 on a T-shaped bell crank pivoted on the frame 22 at 40 to swing about an axis parallel to the brake actuating rockshaft 21. The bell crank has an arm 42 depending from the pivot and connected at its lower end to one end of a link 43 whose other end is connected to a crank 44 fast on the end of the rockshaft 21. When the relay 23 is energized, it will be apparent that the rockshaft 21 and the brake cam 20 will be rocked counterclockwise as shown in Fig. 5, thereby releasing the brake against the action of the springs 16. In a similar way, the cam will be rocked reversely to release the brake when the relay 24 is energized. In each instance, the actuated armature will be moved upwardly and the brake will be applied by the springs 16 when the energized relay is deenergized by its limit switch in the manner described above.

It will be apparent that the brake is actually released before the motor is energized instead of being actuated in the usual way by a separate solenoid whose energization is coincident with the energization of the motor. Also, the brake is applied at the instant the limit switch is opened to deenergize the motor, instead of being delayed until the magnetic contactor has dropped out after opening of the limit switch. This results in freer starting and quicker stopping of the motor operator. At the same time, the structure and the circuit arrangements are greatly simplified. The brake itself is of the simple pivoted shoe type, and is equally effective in both directions of motion of the actuating cam, while at the same time precluding any uncontrollable self-energizing effect.

Provision is also made, as a safety measure, for positively insuring deenergization of the motor if, for some reason, the limit switches fail to operate properly. For this purpose, the arm 42 of the T-shaped bell crank is disposed adjacent the screw shaft 36 and is provided with projections 45 and 45′ in the paths of the nuts 35 and 35′. If, by failure of the limit switch 30′, the motor is not stopped when the pin 34′ of the limit switch is depressed by the cam 35′ as shown in Fig. 2, the nut 35′ will immediately engage the projection 45′ and rock the bell crank to positively lower the armature 26′ and thereby break the motor circuit independently of the limit switch. In a similar way, the nut 35 will engage the projection 45 and rock the bell crank reversely to open the switches of the contactor 23 if the limit switch 30 fails to function properly at the end of the reverse cycle of the operator.

I claim as my invention:

1. A power operator having, in combination, a reversible electric motor, a shaft driven thereby, a rockshaft extending along the motor shaft parallel thereto, a cam on said shaft, arms projecting in opposite directions from a common pivot and connected to said rockshaft, magnetic relays having armatures connected to the respective arms for turning said rockshaft in opposite directions when the respective armatures are moved by energization of their relays, switching means actuated by movement of the respective armatures to control the energization of said motor, a friction brake for said shaft actuated by said cam, and spring means acting on said brake and cam to apply the brake and return said cam and rockshaft to a predetermined neutral position in response to movement of said armatures to deenergize said motor.

2. A power operator comprising, in combination, an electric motor, a shaft driven thereby, a mechanical friction brake for retarding said shaft having an actuating cam, said brake being applied by turning said cam in opposite directions away from normal brake-applied position, two magnetic relays having armatures movable upon energization of the respective relays to initiate and maintain operation of said motor in opposite directions, means connecting said armatures to said cam to turn the latter in opposite directions from said brake-applied position when the respective relays are energized, and spring means acting to return said cam to said applied position when both of said relays are deenergized.

3. A power operator having, in combination, a reversible electric motor, a shaft driven thereby, two magnetic relays with armatures selectively energizable to initiate operation of said motor in opposite directions and to maintain such operation during the continued energization of the relay, a rockshaft connected to said armatures and turned in one direction or the other out of a neutral position according to which of said relays is energized, means normally urging said shaft toward said neutral position, a brake for stopping said driven shaft when the motor is deenergized, and means actuated by turning of said rockshaft in either direction from said neutral position to release said brake, said brake being applied automatically in the return of said rockshaft to said neutral position.

4. A power operator having, in combination, a reversible electric motor, magnetic relays having movable armatures, circuits selectively energized by the respective relays and operable to control the direction and extent of operation of said motor according to which of the relays is energized, said circuits including limit switches adapted when opened to deenergize the active relay, means driven by said motor and operable after predetermined rotation thereof to open the closed limit switch and thereby deenergize the active relay and the motor, and means mechanically connected to the armatures of said relays and operable in the event of failure of the active limit switch to mechanically shift the armature of the active relay to deenergized positions.

5. A power operator having, in combination, a reversible electric motor, a magnetic relay having a movable armature, a circuit energized by the relay and operable to control the starting and extent of operation of said motor, said circuit including a limit switch adapted when opened to deenergize said relay, means driven by said motor and operable after predetermined rotation thereof to open the closed limit switch and thereby deenergize said relay and the motor, and means mechanically connected to the armature of said relay and operable in the event of failure of said limit switch to mechanically shift the relay armature to deenergized position.

6. A power operator having, in combination, a reversible electric motor having a shaft, means on said shaft providing a rotatable annular friction surface, an element radially expandible and contractible in the plane of rotation of said surface to grip and release the latter and cooperating with the surface to form a brake, spring means normally moving said element into gripping engagement with said surface, a rockshaft paralleling said motor shaft and carrying a cam normally disposed in a brake-applied position and operable by turning of said rockshaft in either direction away from such position to actuate said element and release said brake, magnetic relays having armatures connected to said rockshaft to turn the latter in one direction or the other away from brake-applied position according to which of the relays is energized, and switches actuated by movement of the respective relay armatures to effect energization of said motor for rotation thereof in opposite directions.

7. A power operator having, in combination, an electric motor, a magnetic relay having an armature adapted to move between two positions to start and stop said motor when the relay is energized and deenergized respectively, an element connected to said armature and movable therewith along a predetermined path to a motor starting position and reversely to a motor stopping position, a member driven at a reduced speed by said motor along said path and in the motor stopping direction, said member being engageable with said element after a predetermined movement and operable to move the latter and said armature reversely to the motor stopping position, and a limit switch adapted to deenergize said relay and arranged to be engaged and actuated by said member before the latter encounters and moves said element.

8. A power operator having, in combination, an electric motor, a magnetic relay including an element movable between starting and stopping positions to start and stop said motor in response to energization and deenergization of said relay, a member driven by said motor after movement of said element to starting position and adapted after a predetermined rotation of the motor to engage said element and move the latter reversely from said starting to said stopping position, a limit switch for effecting deenergization of said relay, and means actuated by said movement of said member and normally operable thereby to open said limit switch before the member encounters and actuates said element.

EDMUND A. REHWALD.

REFERENCES CITED

The following references are of record in the file of this patent:

UNITED STATES PATENTS

| Number | Name | Date |
| --- | --- | --- |
| 1,744,228 | Kaufman | Jan. 21, 1930 |
| 1,923,034 | Hendricksen | Aug. 15, 1933 |
| 2,088,212 | Milne | July 27, 1937 |
| 2,175,037 | Smith | Oct. 3, 1939 |
| 2,214,807 | Buckley | Sept. 17, 1940 |